(12) United States Patent
Kurtenbach et al.

(10) Patent No.: US 7,583,252 B2
(45) Date of Patent: *Sep. 1, 2009

(54) THREE DIMENSIONAL VOLUMETRIC DISPLAY INPUT AND OUTPUT CONFIGURATIONS

(75) Inventors: Gordon Paul Kurtenbach, Toronto (CA); George William Fitzmaurice, Toronto (CA); Ravin Balakrishnan, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 642 days.

This patent is subject to a terminal disclaimer.

(21) Appl. No.: 10/830,073

(22) Filed: Apr. 23, 2004

(65) Prior Publication Data

US 2004/0207599 A1 Oct. 21, 2004

Related U.S. Application Data

(63) Continuation of application No. 10/183,970, filed on Jun. 28, 2002, now Pat. No. 6,753,847.

(60) Provisional application No. 60/350,952, filed on Jan. 25, 2002.

(51) Int. Cl.
*G09G 5/00* (2006.01)
(52) U.S. Cl. ........................................... 345/156; 345/6
(58) Field of Classification Search ................ 345/156, 345/157, 173–179, 36
See application file for complete search history.

(56) References Cited

U.S. PATENT DOCUMENTS

| 4,134,104 A | 1/1979 | Karras |
| 4,160,973 A | 7/1979 | Berlin, Jr. |
| 5,717,415 A | 2/1998 | Iue et al. |
| 5,767,854 A | 6/1998 | Anwar |
| 5,805,137 A | 9/1998 | Yasutake |
| 5,844,561 A * | 12/1998 | Tanimoto et al. ............ 715/703 |
| 5,854,449 A | 12/1998 | Adkins |
| 6,008,809 A | 12/1999 | Brooks |
| 6,031,541 A | 2/2000 | Lipscomb |
| 6,049,317 A | 4/2000 | Thompson |
| 6,064,423 A | 5/2000 | Geng |

(Continued)

OTHER PUBLICATIONS

W. Buxton and G.W. Fitzmaurice, "HMD's, Caves, and Chameleon: A Human-Centric Analysis of Interaction in Virtual Space," Computer Graphics, vol. 32, No. 4, 1998, pp. 64-68.

(Continued)

*Primary Examiner*—Kevin M Nguyen
(74) *Attorney, Agent, or Firm*—Staas & Halsey LLP (57) ABSTRACT

The present invention is a system that allows a number of 3D volumetric display or output configurations, such as dome, cubical and cylindrical volumetric displays, to interact with a number of different input configurations, such as a three-dimensional position sensing system having a volume sensing field, a planar position sensing system having a digitizing tablet, and a non-planar position sensing system having a sensing grid formed on a dome. The user interacts via the input configurations, such as by moving a digitizing stylus on the sensing grid formed on the dome enclosure surface. This interaction affects the content of the volumetric display by mapping positions and corresponding vectors of the stylus to a moving cursor within the 3D display space of the volumetric display that is offset from a tip of the stylus along the vector.

26 Claims, 9 Drawing Sheets

U.S. PATENT DOCUMENTS

| | | | |
|---|---|---|---|
| 6,115,028 | A | 9/2000 | Balakrishnan et al. |
| 6,208,318 | B1 | 3/2001 | Anderson et al. |
| 6,229,542 | B1 | 5/2001 | Miller |
| 6,667,740 | B2 * | 12/2003 | Ely et al. .................. 345/179 |
| 6,765,566 | B1 * | 7/2004 | Tsao ........................ 345/419 |
| 6,900,779 | B1 * | 5/2005 | Geng ........................ 345/30 |
| 7,061,475 | B2 * | 6/2006 | Kent ........................ 345/177 |
| 2002/0008676 | A1 | 1/2002 | Miyazaki et al. |

OTHER PUBLICATIONS

M. Czernuszenko et al., "The ImmersaDesk and Infinity Wall Projection-Based Virtual Reality Displays," Computer Graphics, vol. 31, No. 2, 1997, pp. 46-49.

D. Ebert et al., "Realizing 3D Visualization using Crossed-Beam Volumetric Displays," Comm. ACM vol. 42, No. 8, 1999, pp. 101-107.

M. Lucente, "Interactive Three-Dimensional Holographic Displays: Seeing the Future in Depth," Computer Graphics, May 1997, pp. 63-67.

M. Sinclair, "The Haptic Lens," Proc. Siggraph 97, ACM Press, New York, 1997, p. 179.

T. Murakami and N. Nakajima, "Direct and Intuitive Input Device for 3D Shape Deformation," Proc. Computer-Human Interaction (CHI 94), ACM Press, New York, 1994, pp. 465-470.

R. Balakrishnan et al., "The Rockin'Mouse: Integral 3D Manipulation on a Plane," Proc. Computer-Human Interaction (CHI 97), ACM Press, New York, 1997, pp. 311-318.

G. Fitzmaurice, H. Ishii, and W. Buxton, "Bricks: Laying the Foundations for Graspable User Interfaces," Proc. Computer-Human Interaction (CHI 95), ACM Press, New York, 1995, pp. 442-449.

S. Zhai, W. Buxton, and P. Milgram, "The 'Silk Cursor': Investigating Transparency for 3D Target Acquisition," Proc. Computer-Human Interaction (CHI 94), ACM Press, New York, 1994, pp. 459-464.

B. Conner et al., "Three Dimensional Widgets," Computer Graphics, vol. 22, No. 4, 1992, pp. 121-129.

G. Fitzmaurice et al., "An Exploration into Supporting Artwork Orientation in the User Interface," Proc. Computer-Human Interaction (CHI 99), ACM Press, New York, 1999, pp. 167-174.

Ken-ichi Kameyama, et al., "Virtual Surgical Operation System Using Volume Scanning Display", Image Capture, Formatting, and Display, SPIE, vol. 2164, Medical Imaging 1994, pp. 146-154.

Michael Halle, "Autostereoscopic Displays and Computer Graphics", Computer Graphics, ACM SIGGRAPH, 31(2), May 1997, pp. 58-62.

Gregg Favalora et al., "Volumetric Three-Dimensional Display System with Rasterization Hardware", SPIE, vol. 4297A, Feb. 2001.

E. Sachs, A. Roberts and D. Stoops, "3-Draw: A Tool for the Conceptual Design of Three Dimensional Shape", IEEE Computer Graphics and Applications, Jan. 1990.

J. Viega et al., "3D Magic Lenses", UIST 1996, Seattle, Washington, pp. 51-58.

K. Kameyama, K. Ohtomi and Y. Fukui, "Interactive Volume Scanning 3-D Display with an Optical Relay System and Multidimensional Input Devices", SPIE vol. 1915 Stereoscopic Displays and Applications IV (1993), pp. 12-20.

K. Kameyama and K. Ohtomi, "A Shape Modeling System with a Volume Scanning Display and Multisensory Input Device", Presence: vol. 2, No. 2, 1993, pp. 104-111.

K. Kameyama and K. Ohtomi, "VR System Using Volume Scanning Display and Multi-Dimensional Input Device", ISMCR, Nov. 1992, pp. 473-479.

K. Kameyama, K. Ohtomi and Yukio Fukui, "A Virtual Reality System Using a Volume Scanning 3D Display", 1991.

PCT International Search Report, PCT/US03/02341, filed Jan. 27, 2003, mailed Aug. 8, 2003.

U.S. Appl. No. 10/183,966, filed Jun. 28, 2002, Kurtenbach, et al., Silicon Graphics, Inc.

U.S. Appl. No. 10/183,945, filed Jun. 28, 2002, Fitzmaurice, et al., Silicon Graphics, Inc.

U.S. Appl. No. 10/183,968, filed Jun. 28, 2002, Fitzmaurice, et al., Silicon Graphics, Inc.

U.S. Appl. No. 10/188,765, filed Jun. 28, 2002, Balakrishnan, et al., Silicon Graphics, Inc.

U.S. Appl. No. 10/183,944, filed Jun. 28, 2002, Balakrishnan, et al., Silicon Graphics, Inc.

U.S. Appl. No. 10/183,970, filed Jun. 28, 2002, Kurtenbach, et al., Silicon Graphics, Inc.

R. Balakrishnan et al., "User Interfaces for Volumetric Displays", Mar. 2001, (IEEE).

* cited by examiner

FIG. 16A
TRANSPARENT DIGITIZING TABLET 252

FIG. 16B
ENCLOSURE WITH TRANSPARENT DIGITIZING TABLET 258

FIG. 16C
ENCLOSURE WITH TRANSPARENT DIGITIZING TABLET 262

FIG. 16D
TRANSPARENT DIGITIZING TABLET 266

THREE DIMENSIONAL VOLUMETRIC DISPLAY INPUT AND OUTPUT CONFIGURATIONS

CROSS-REFERENCE TO RELATED APPLICATION(S)

This application is related to, is a continuation of and claims priority to U.S. application entitled Three Dimensional Volumetric Display Input and Output Configurations, having Ser. No. 10/183,970, by Kurtenbach et al., filed Jun. 28, 2002 now U.S. Pat. No. 6,753,847 (allowed), which claims priority to U.S. provisional application entitled User Interfaces For Volumetric Displays, having Ser. No. 60/350,952, by Kurtenbach et al, filed Jan. 25, 2002. This application is also related to U.S. application entitled Volume Management System For Volumetric Displays, having Ser. No. 10/183,966, by Kurtenbach et al, filed Jun. 28, 2002, to U.S. application entitled Widgets Displayed And Operable On A Surface Of A Volumetric Display Enclosure, having Ser. No. 10/183,945 by Fitzmaurice et al, filed Jun. 28, 2002, to U.S. application entitled Graphical User Interface Widgets Viewable And Readable From Multiple Viewpoints In A Volumetric Display, having Ser. No. 10/183,968, by Fitzmaurice et al, filed Jun. 28, 2002, to U.S. application entitled A System For Physical Rotation of Volumetric Display Enclosures To Facilitate Viewing, having Ser. No. 10/183,765, by Balakrishnan et al, filed Jun. 28, 2002, and to U.S. application entitled Techniques For Pointing To Locations Within A Volumetric Display, having Ser. No. 10/183,944, by Balakrishnan et al, filed Jun. 28, 2002, and all of which are incorporated by reference herein.

BACKGROUND OF THE INVENTION

1. Field of the Invention

The present invention is directed to input and output configurations for three-dimensional volumetric displays and, more particularly, to input configurations that allow the content of a three-dimensional volumetric display output configuration to be affected by actions by a user operating within an input configuration.

2. Description of the Related Art

A class of three-dimensional (3D) displays, called volumetric displays, is currently undergoing rapid advancement. The types of displays in this class include holographic displays, swept volume displays and static volume displays. Volumetric displays allow for three-dimensional (3D) graphical scenes to be displayed within a true 3D volume. Such displays can take many shapes including cylinders, globes, domes, cubes, an arbitrary shape, etc. with a dome being a typical shape. Because the technology of these displays is undergoing rapid development those of skill in the art are concentrating on the engineering of the display itself. As a result, the man-machine interface to or input/output configurations with which people interface with these types of displays is receiving scant attention.

While the volumetric displays allow a user to view different parts of a true 3D scene, the act of viewing the different parts typically requires that the user physically move around (or over) the display or that the display be moved or rotated in front of the user. As the display moves relative to the user, graphical objects may also move relative to the user. When the display is relatively stationary or when it is relatively moving, the user may need to interact with the display. As a result, what the user needs is an effective mechanism for interacting with the display.

SUMMARY OF THE INVENTION

It is an aspect of the present invention to provide effective mechanisms for a user to interact with content of the three-dimensional volumetric display.

It is also an aspect of the present invention to provide input and output configurations for a three-dimensional volumetric display.

It is another aspect of the present invention to provide dome, cubical and cylindrical output configurations.

It is also an aspect of the present invention to provide input configurations that allow a 3D volumetric input space to be mapped to the 3D volumetric display, a planer 2D input space to be mapped to the 3D volumetric display, a planar 2D input space to be mapped to a planar 2D space within the 3D volumetric display, and a non-planar 2D input space to be mapped to the 3D volumetric display.

The above aspects can be attained by a system that allows a number of 3D volumetric display configurations, such as dome, cubical and cylindrical volumetric display enclosures, to interact with a number of different input configurations, for example, a three-dimensional position sensing system, a planar position sensing system and a non-planar position sensing system. The user interacts with the input configurations, such as by moving a stylus on a sensing grid formed on an enclosure surface. This interaction affects the content of the volumetric display, for example, by moving a cursor within the 3D display space of the volumetric display.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
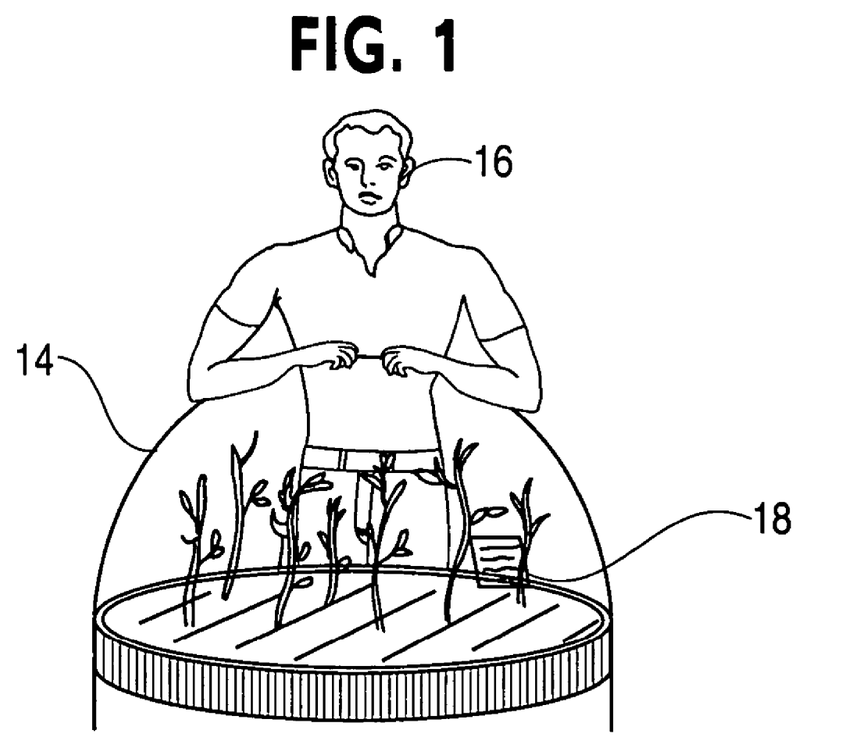
FIG. 1 shows a volumetric display.

Volumetric displays allow a user to have a true three-dimensional (3D) view of a scene 12 and are typically provided in the form of a dome 14, as depicted in FIG. 1. The user 16, as can be surmised from FIG. 1, can move about the dome 14 to view different parts of the scene 12. From a particular arbitrary viewpoint or position, a user may want to interact with the scene or content within the volumetric display.

There are a number of different solutions to this problem. These solutions involve creating input/output configurations for the volumetric display that define a spatial correspondence between an input space and an output space. The configurations also define a dynamically updatable spatial correspondence of the input and output spaces with the user.

Figure 2:
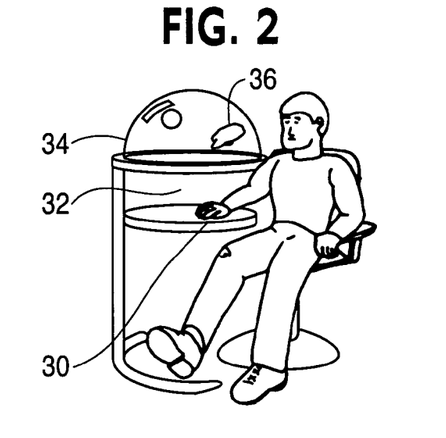
FIGS. 2, 3 and 4 depict a 3D to 3D system configurations.
Figure 3:
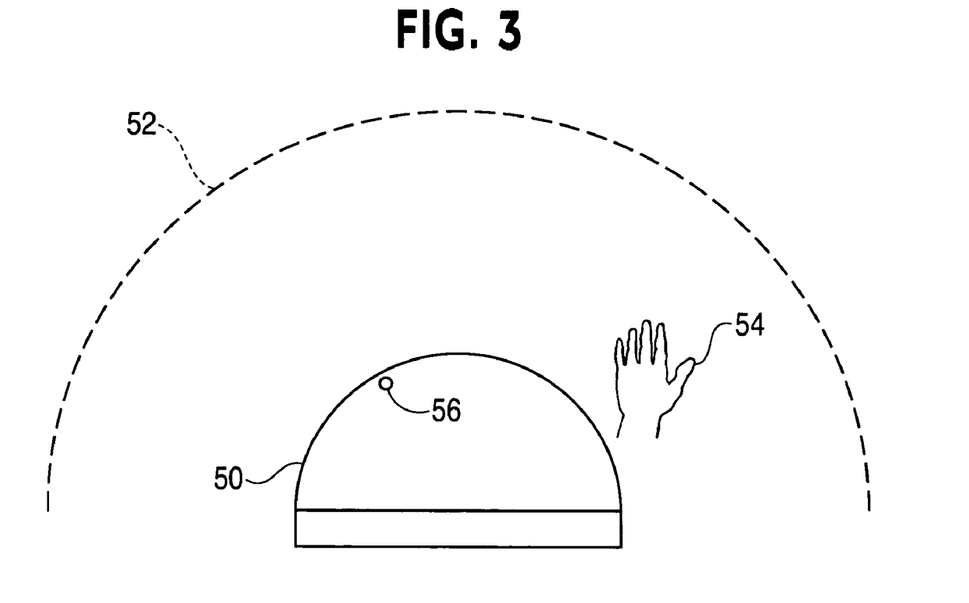
Figure 4:
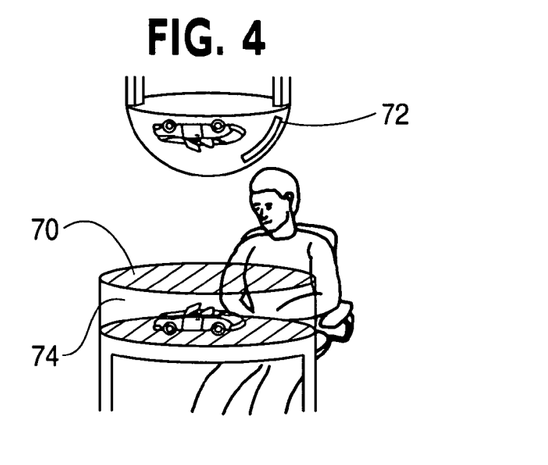

In a first solution, a 3D volumetric input space is mapped to a 3D volumetric display space. In one configuration, as depicted in FIG. 2, the user's hand 30 is tracked via a glove or a set of cameras in a volume 32 directly below the display volume 34. A virtual representation of the hand 36, or some other type of position indicator, such as a cursor, is superimposed into the 3D output volumetric display 34. In a second configuration, as depicted in FIG. 3, the 3D display 50 is surrounded by a 3D input space 52, created by a 3D volume input system, such as the Flock of Birds system from Ascension Technology Corporation. In this configuration, the user's hand 54, including a position indicator/sensor, is mapped to a cursor 56 or some other position indicator representation, such as a virtual hand, within the display 50. The position sensor also produces a vector that indicates which direction the sensor is pointing. The vector can be used to create a cursor in the enclosure at a fixed position along the vector. Rather than using the vector produced by the position sensor, the system infers an input vector based on the position of the input device and the center of the display. This spatial relationship or correspondence between the input space, output space and user position is dynamically updated as the user moves about the display. That is, the input/output space is automatically compensated/reconfigured. Another configuration is to use half-silvered mirrors 70 (see FIG. 4) to combine the volumetric image 72 with the user's view of their hands in a hand movement volume. This way, the user sees their hands operating within the display. Another alternative is to use a camera to capture the users hands in the input space and superimpose them onto the volumetric display space. Another alternative is an augmented-reality system where the user has a see-through, head mounted display (2D) which is being tracked. As the user moves the position and orientation of their head, graphics are presented on the LCD display and are aligned with real-world objects.

Figure 5:
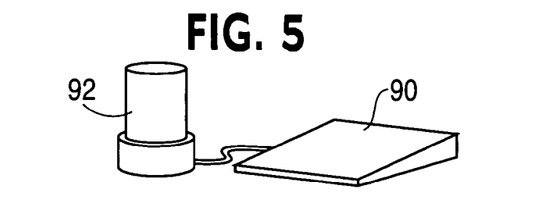
FIGS. 5, 6 and 7 depict 2D to 3D configurations.

Another solution is to map a planer 2D input space into a 3D output space. This is particularly useful in controlling some subset of the 3D volumetric display space. For example, a standard 2D digitizing tablet or digitizer 90 (see FIG. 5) or a regular mouse can be mapped to control aspects of the 3D scene, such as moving 3D objects along two dimensions.

Figure 6:
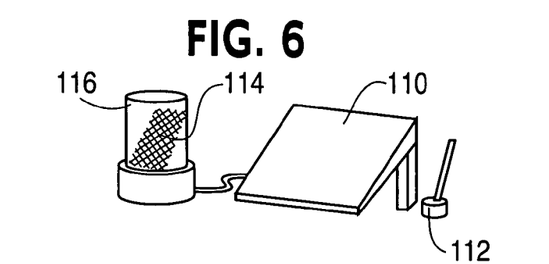
Figure 7:
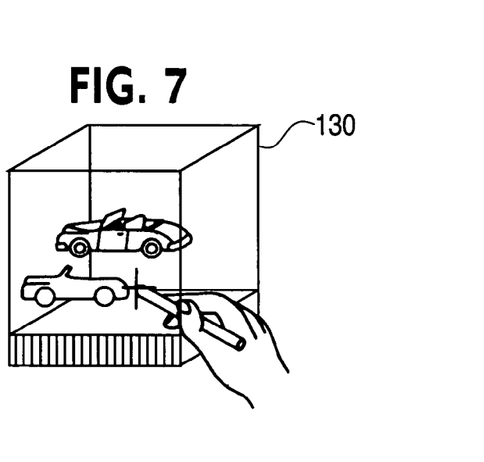

A further solution is to map a planar 2D input space to a planar 2D space within the 3D output space of the display, as depicted in FIG. 6. In this situation, the system maps the input space of a digitizing tablet 110 and the tilt/orientation of the tablet as sensed by a tilt/orientation sensor 112 to a corresponding planar space 114 in the display 116. The angle of the plane 114 is responsive to the sensor 112. If the display enclosure 130 has planar surfaces (e.g., a cubic enclosure), the enclosure surface is used as the planar input device, as depicted in FIG. 7. It is also possible to use a transparent digitizer superimposed over an LCD display.

Figure 8:
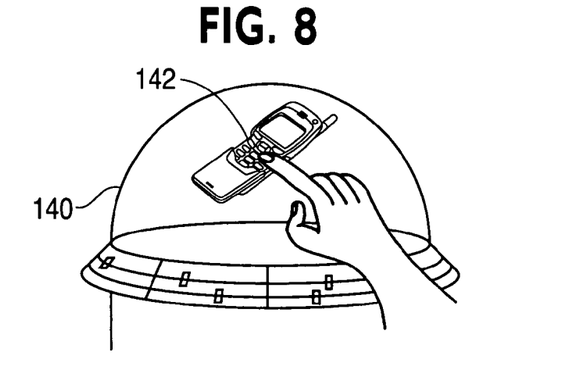
FIG. 8 shows a non-planar to 3D configuration.

Still another solution is to map a non-planar 2D input space to a 3D output space. In this solution, as depicted in FIG. 8, the system uses the display enclosure 140 as the input space (i.e., the enclosure is a transparent digitizing input surface). In this embodiment, the position 142 touched by the user or indicated by a pointing device, such as a stylus or surface fitting curved mouse, is mapped to a position in the display. This is a direct and compelling way to interact with these displays.

In addition to direct manipulation using the hands, the solutions described herein also provide physical intermediaries between the hands and the input space as described below.

Figure 9:
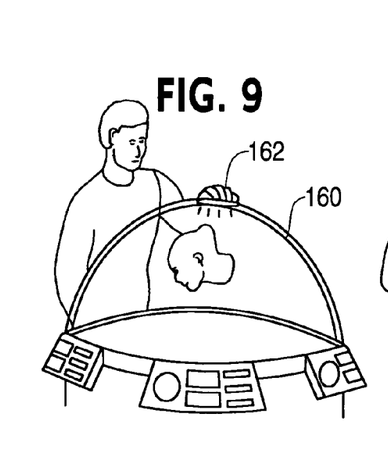
FIGS. 9, 10, 11, 12, 13 and 14 show configurations with physical intermediaries.

Another solution when the user desires to interact directly with the enclosure surface, is to deform the surface 160 of a conventional deformable membrane surface that detects multiple pressure points and finger pinches 162, as depicted in FIG. 9. In this situation, the surface to display mapping discussed above is performed.

Figure 10:
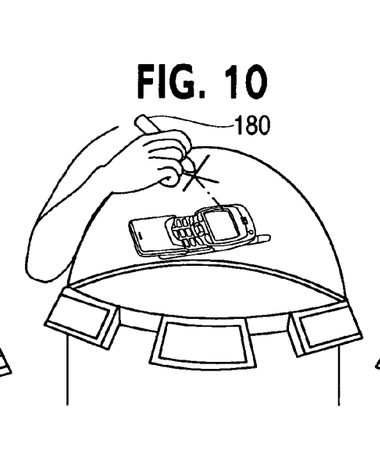
Figure 11:
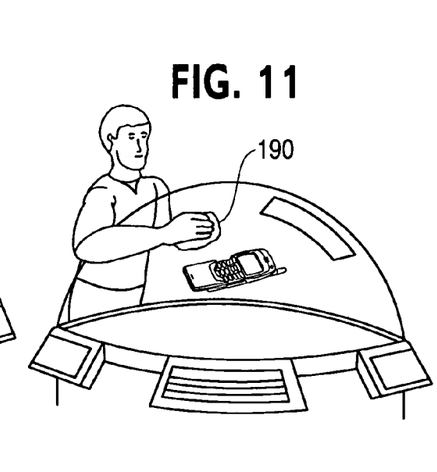

Instead of using the hands directly on the enclosure surface, the system has a surface that detects and tracks a variety of input devices. A digital stylus 180, as shown in FIG. 10, where a point and an orientation can be input or a Rockin'Mouse shaped device 190, as shown in FIG. 11 (see U.S. Pat. No. 6,115,028) also allowing a point and an orientation to be input are used. A surface fitting wireless mouse, such as a curved (concave) bottom mouse, can be used with a curved surface output configuration. This type of mouse can also be park-able using electrostatic, magnetic or some other sticky method of removably adhering the mouse to the display surface. Using a mouse has the advantage of buttons and form factors with which people are familiar. In this situation, the surface to display mapping discussed above is performed.

The physical intermediaries also do not have to be on the enclosure itself as described below.

Figure 12:
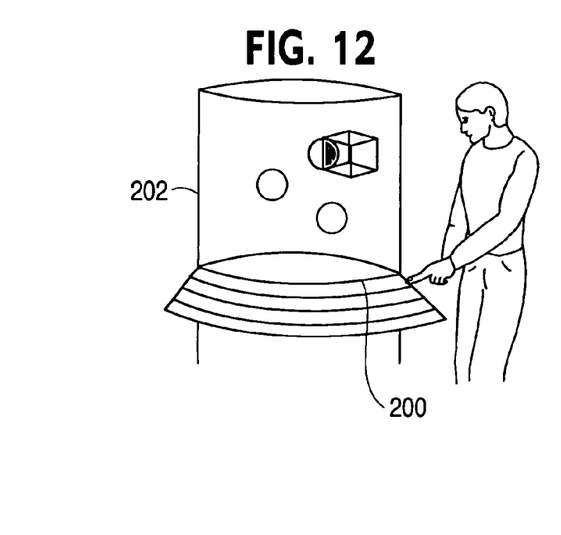
Figure 13:
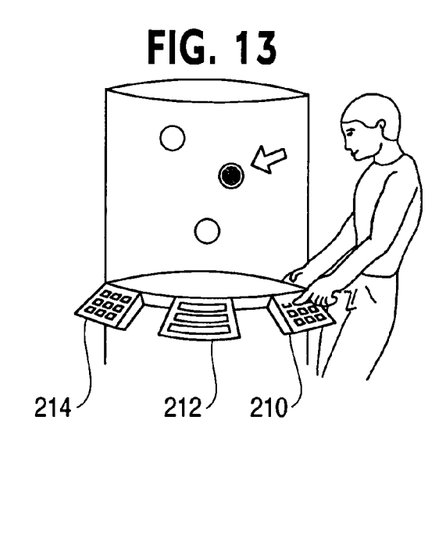
Figure 14:
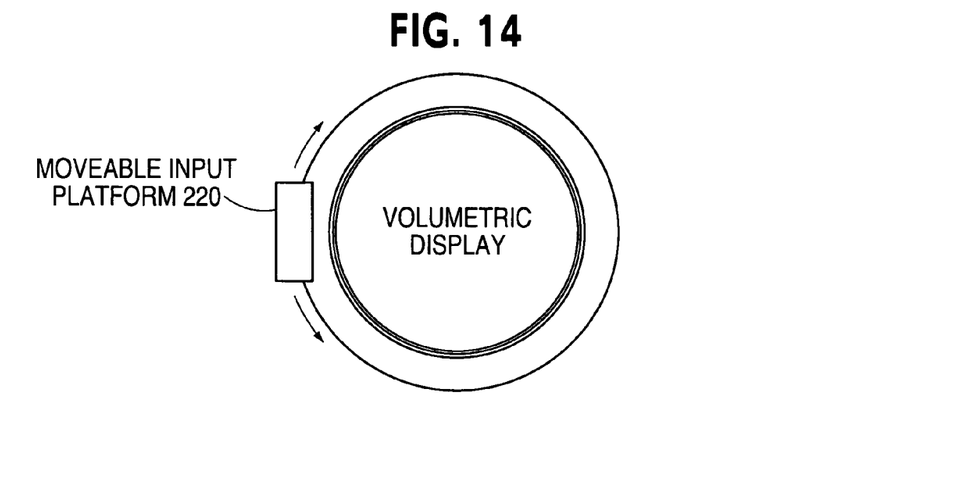

In an embodiment input devices 200, such as buttons, keyboards, sliders, touch-pads, mice and space-ball type devices, etc., are mounted along the perimeter of the display (see FIG. 12). In this embodiment, the input devices such as buttons for up, down, forward, backward, left and right motions, allowing multiple degrees of freedom, are used to control the position of a cursor like such buttons control the position of a cursor in a 2D system. The input devices 210, 212, 214 may need to be "repeated" (i.e., have more than one of each along the perimeter) to allow for simultaneous used by many users, or for use from any position the user may be standing/sitting at as shown in FIG. 13. Rather that having multiple input devices positioned around the display as depicted in FIG. 13, the mounting platform 220 that houses these devices could be made moveable (rotatable) around the display, as depicted in FIG. 14, so that users can easily bring the required device within reach by simply moving the platform. These devices typically communicate wirelessly by radio or infrared signals. The position of the movable device also provides information about the users position or viewpoint.

Figure 15:
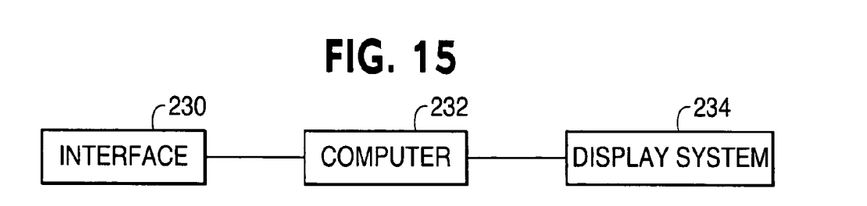
FIG. 15 depicts components of the system

The present invention is typically embodied in a system as depicted in FIG. 15 where physical interface elements 230, such as a rotary dome position encoder, infrared user position detectors, a keyboard, touch sensitive dome enclosure surface, mouse, beam pointer, beam pointer with thumbwheel, stylus and digitizer pad or stylus and stylus sensitive dome enclosure surface, stylus with pressure sensor, flock-of-birds, etc. are coupled to a computer 232, such as a server class machine. The computer 232 uses a graphical creation process, such as the animation package MAYA available from Alias|Wavefront, Inc., to create three-dimensional (3D) scene elements. This process, using position inputs from the input configurations as discussed herein, also creates the virtual interface elements, such as a virtual hand, a 3D point cursor, a 3D volume cursor, a pointing beam, a bead, etc. The display output, including the scene and interface elements, is provided to a volumetric display apparatus configuration 234, such as one that will produce a 3D holographic display and discussed herein.

Figure 16A:
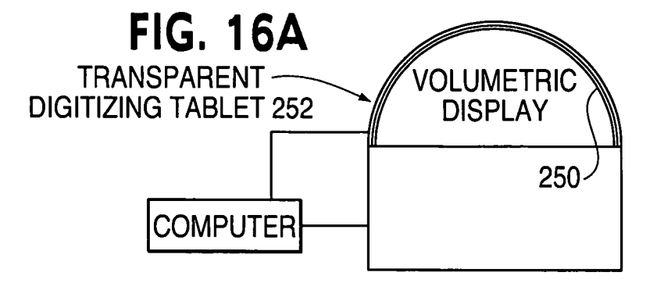
FIGS. 16A, 16B, 16C and 16D illustrate digitizer embodiments.
Figure 16B:
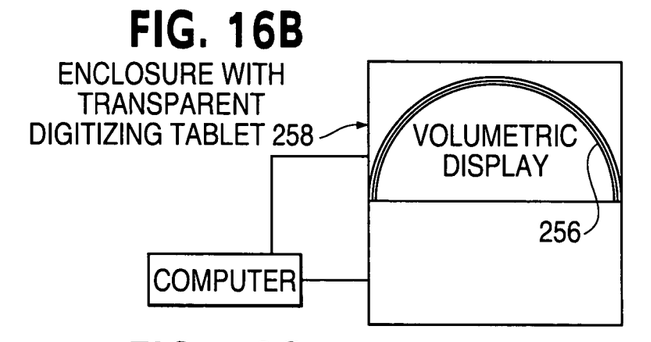
Figure 16C:
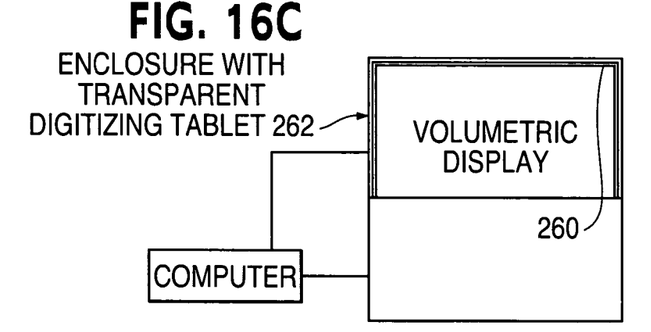
Figure 16D:
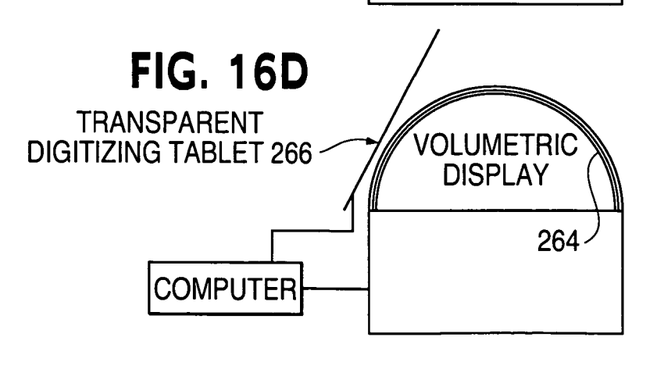

The configurations that include a transparent digitizer or touch sensitive surface have a number of different shapes as depicted in FIGS. 16A-16D. In one embodiment a dome shaped enclosure 250 has a dome shaped digitizing tablet as depicted in FIG. 16A. In another embodiment the dome shaped enclosure 256 (see FIG. 16B) is used with a rectangular or cylindrical shaped digitizing tablet 258. In a further embodiment, as shown in FIG. 16C, a cylindrical or cubical enclosure 260 is used with cylindrical or cubical digitizer surface. In a different embodiment the enclosure 264 is dome shaped (or cubical or cylindrical) and the digitizing surface 266 is planar as depicted in FIG. 16D.

Figure 17:
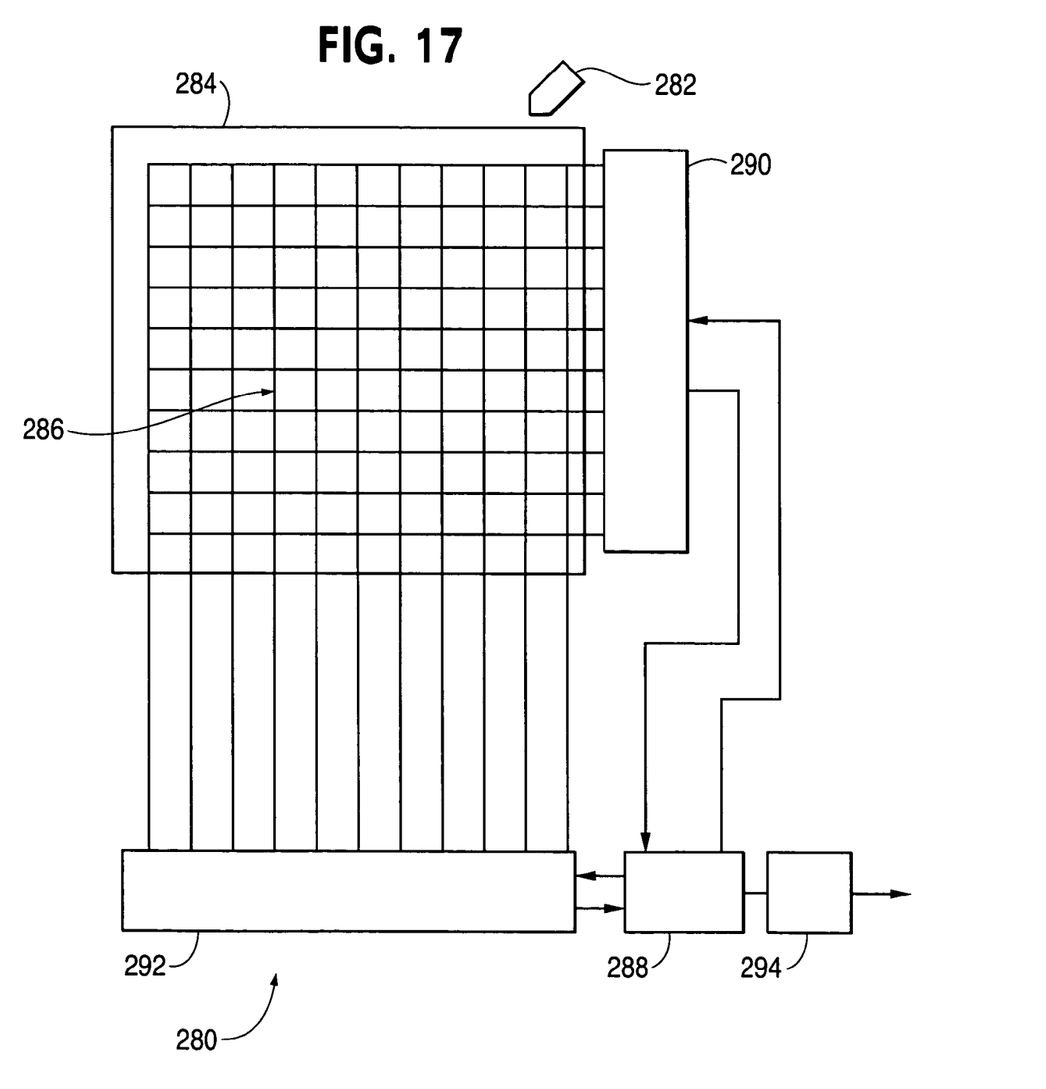
FIG. 17 illustrates components of a digitizer.

A digitizer 280 (see FIG. 17), such as described in U.S. Pat. No. 5,854,449 incorporated by reference herein, determines a position of a stylus or pointer 282 relative to a surface 284, such as a transparent dome surface, having a checker board type closely spaced positional grid 286 thereon when seen from above. A processor 288 determines the coarse position of the pointer relative to the grid by sampling the grid lines through a set of multiplexers 290 and 292. An error correction system 294 generates and outputs a true position of the pointer 282 relative to the surface 284 to a computer system 232 (see FIG. 15). The pointer 282 typically includes an electromagnetic transducer for inducing a signal in the positional grid 286 and the processor 288 is coupled to the positional grid 286 for sensing the signal and generating the coarse position of the pointer 282. The transducers also allow the determination of a vector from grid signals that indicates in which direction the pointer 282 is pointing. Touch sensitive input surfaces operate in a similar fashion.

Figures 18A, 18C:
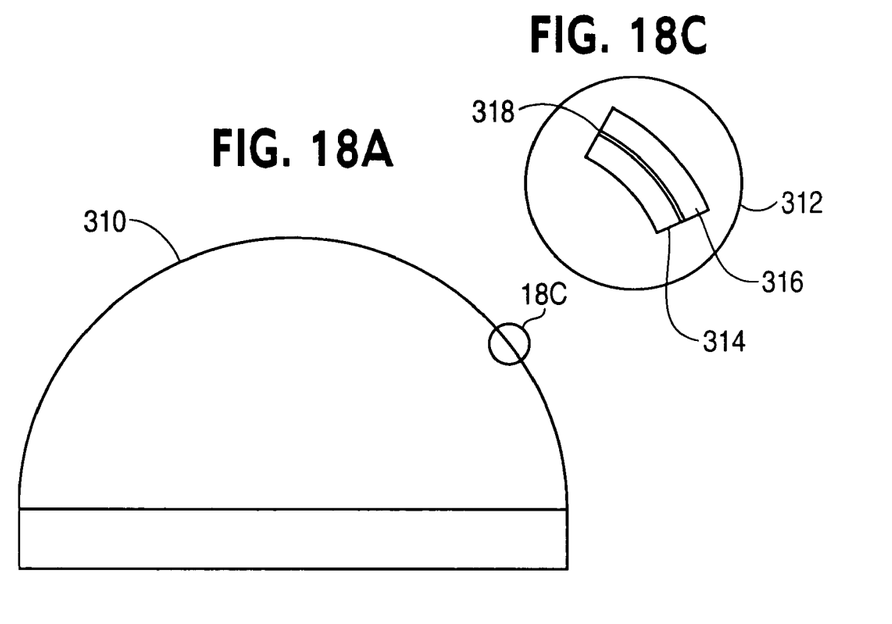
FIGS. 18A, 18B and 18C show details of a dome shaped digitizer.
Figure 18B:
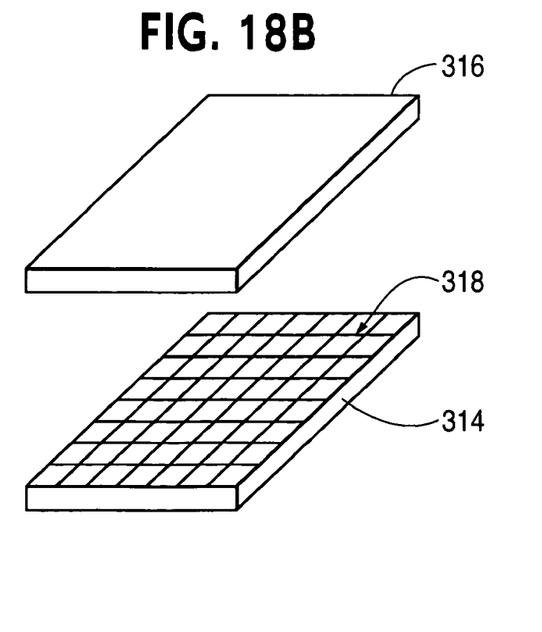

The positional grid 286 can be applied to a surface of an enclosure, such as a dome shaped enclosure 310, as depicted in FIGS. 18A and 18B. FIGS. 18A and 18B (an exploded view) show a section 312 of the dome surface including an inner substrate 314 and outer substrate 316 between which is sandwiched the grid 318. The substrates comprise transparent materials, such as glass or plastic.

Figure 19:
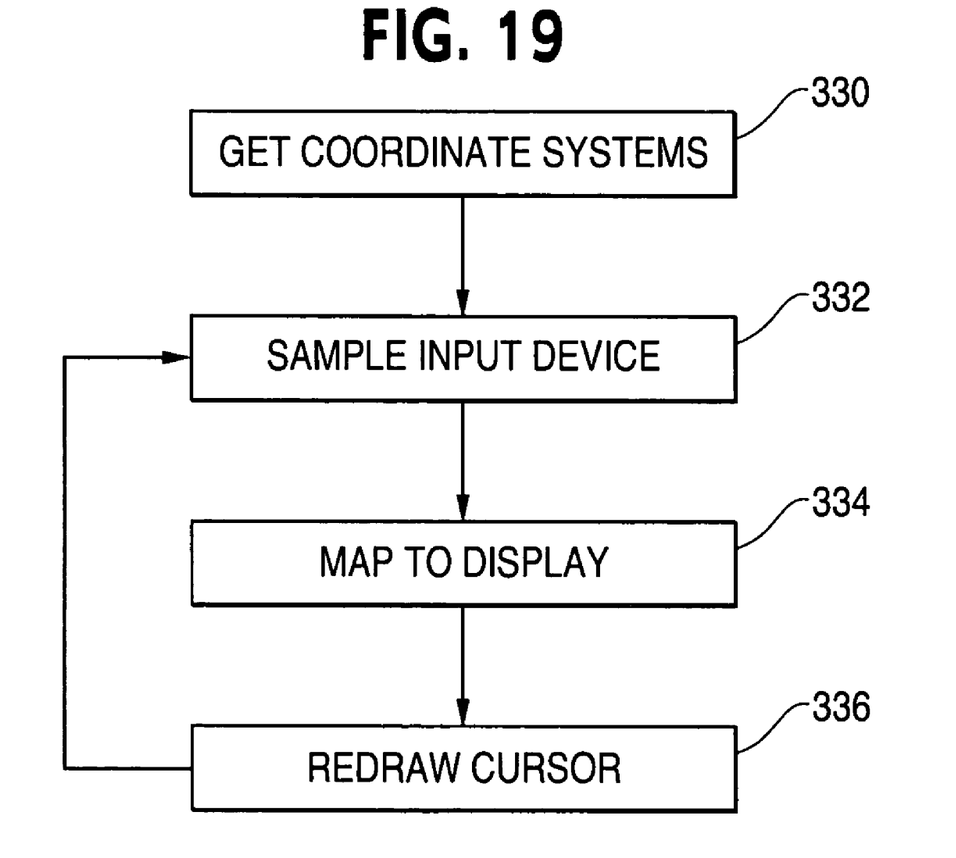
FIG. 19 depicts the operations of the system.

In using these input and output configurations the computer system 232 (see FIG. 15) performs a number of operations as depicted in FIG. 19. The operations include obtaining 330 the coordinate systems of the input device and the volumetric display. The range of the coordinate systems is also obtained so that out-of-space conditions can be determined. Next, the system samples 332 positional outputs of the input device, such as the digitizer, mouse, flock-of-birds, etc., to obtain the location of the users input. This information can also include information about where the user is pointing. This position (and orientation if desired) is mapped 334 into a 3D position within the volumetric display using the coordinate system (and the orientation vector, if needed). The cursor or other position indicating representation, such as a virtual hand, is drawn 336 at the mapped position with the volumetric display. The mapping may involve determining a position on the surface that is being touched by a digitizing stylus, projecting a ray into the enclosure from the touch position where the ray is oriented by the pointing vector of the input stylus and positioning the cursor at a variable or fixed position along the ray. Another mapping causes relative motion of a 3D input device such as a glove to be imparted to a cursor when a motion function is activated. Other mappings as discussed in the related applications are possible.

The operations described with respect to FIG. 19, when a digitizing enclosure surface is the input configuration, allow the user to interact with a surface of a three-dimensional (3D) volumetric display and affect the 3D content of the display responsive to the interaction. The interaction involves the user manipulating the stylus in a sensing region of the digitizing grid, the mapping of the stylus position to a 3D display position and the creation of a cursor at a 3D display position. The cursor, in one of a number of different possibilities, is created at a distance offset from a tip of the stylus along a pointing vector of the stylus. The cursor can be used to perform typical functions such as selecting, painting, dragging/dropping, etc.

The present invention has been described with respect to input configurations where commands are input through position sensing type devices, such as a mouse, a pointer, touch sensitive surface, etc. It is also possible to use other types of input configurations, such as non-spatial configurations. One non-spatial input space or configuration is a conventional voice or speech recognition system. In this configuration a voice command, such as "down" is recognized and the selected object or volume is moved accordingly. In this case down. The object is moved down in the display space at a constant slow rate until it reaches the bottom or until another command, such as "stop" is input and recognized. For user centric commands, such as "move closer", a user position sensing system inputs the user position, the position is used to determine the relative position of the active object with respect to the user or the vector pointing from user to the object. This vector is used to determine a direction for object movement. To move closer the object is moved along the vector toward the user by moving in a negative direction. Again the motion would continue until a blocking object is encountered or another command is recognized.

Another non-spatial input configuration uses non-speech sounds, such as tones from a conventional multifrequency tone generator. Each multifrequency combination corresponds to a command and a conventional tone recognition system is used to convert the sounds to commands.

The input space or configuration could also use conventional eye-tracking-head-tracking technologies alone or in combination with other input configurations.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A system, comprising:
a three-dimensional (3D) volumetric display output configuration having a display content; and
an input configuration coupled to the volumetric display output configuration and comprising a passive sensor allowing a user to affect the display content with one hand through the passive sensor by mapping the affect to a 3D position of a cursor within the display, while allowing the user to move about the display.

2. A system as recited in claim 1, wherein the sensor comprises a motion tracking camera.

3. A system as recited in claim 1, wherein the sensor comprises a glove and glove tracking system.

4. A system as recited in claim 1, wherein the sensor comprises a touch sensitive surface.

5. A system as recited in claim 1, wherein the sensor comprises magnetic field tracking system.

6. A system as recited in claim 1, wherein the output configuration comprises one of a dome, a cylinder, a cubical box and an arbitrary shape.

7. A system as recited in claim 1, wherein the input configuration comprises one of a 3D volumetric input space mapped to the 3D volumetric display, a planar 2D input space mapped to the 3D volumetric display, a planar 2D input space mapped to a planar 2D space within the 3D volumetric display, and a non-planar 2D input space mapped to the 3D volumetric display.

8. A system as recited in claim 7, wherein the user produces inputs comprising one or directly with a hand, with a surface touching device and with an intermediary device.

9. A system as recited in claim 7, wherein the input configuration further comprises one of an input volume adjacent to the display, an input volume surrounding the display, a digitizing surface covering a surface of the display, a digitizing surface offset from the surface of the display, and an intermediary device used with the display.

10. A system as recited in claim 9, wherein the intermediary device comprises one of a stylus, a surface fitting mouse, a park able mouse, a multi-dimensional mouse, a movable input device positioned on a bottom periphery of the display and a set of identical input devices positioned spaced around a bottom periphery of the display.

11. A system as recited in claim 1, wherein the input configuration comprises a non-planar 2D input space mapped to the 3D volumetric display.

12. A system as recited in claim 1, wherein the input configuration comprises a tracking system tracking a user.

13. A system as recited in claim 1, wherein the input configuration is non-spatial.

14. A system as recited in claim 1, wherein the input configuration comprises a voice recognition system allowing the user to affect the display content using voice commands.

15. A system as recited in claim 14, where the input configuration, output configuration and the user define a dynamically updatable spatial correspondence.

16. A system as recited in claim 1, wherein the input configuration and output configuration define a spatial correspondence between an input space and an output space.

17. A system as recited in claim 16, wherein the spatial correspondences comprises one of 3D to 3D, 2D planar to 3D, 2D planar to 2D planar and non-planar 2D to 3D.

18. A method, comprising:
   interacting, by a user, with a three-dimensional (3D) volumetric display via a passive detecting system; and
   affecting the 3D content of the display responsive to the interaction from one hand of the user by mapping the interacting to a 3D position of a cursor within the display, while allowing the user to move about the display.

19. A method as recited in claim 18, wherein the display comprises a camera and said interacting comprises tracking movements by the user with the camera.

20. A system, comprising:
   a three-dimensional (3D) volumetric display output configuration having a display content; and
   an input configuration coupled to the volumetric display output configuration and allowing a user to affect the display content with one hand by mapping the affect to a 3D position of a cursor within the display, while allowing the user to move about the display, said input configuration comprising a touch sensitive surface overlaid on said display.

21. A system, comprising:
   a three-dimensional (3D) volumetric display output configuration having a display content; and
   an input configuration coupled to the volumetric display output configuration and allowing a user to affect the display content with one hand by mapping the affect to a 3D position of a cursor within the display, while allowing the user to move about the display, said input configuration comprising a surface motion system detecting motion on a surface of said display.

22. A system, comprising:
   a three-dimensional (3D) volumetric display output configuration having a display content; and
   an input configuration coupled to the volumetric display output configuration and allowing a user to affect the display content with one hand by mapping the affect to a 3D position of a cursor within the display, while allowing the user to move about the display, said input configuration comprising an input device moving in three dimensions on a surface of said display.

23. A system, comprising:
   a three-dimensional (3D) volumetric display output configuration having a display content; and
   an input configuration coupled to the volumetric display output configuration and comprising a passive sensor allowing a user to manipulate the display content through the passive sensor with one hand by mapping the affect to a 3D position of a cursor, while allowing the user to move about the display.

24. A system as recited in claim 23, wherein the cursor is superimposed within the volumetric display.

25. A system as recited in claim 22, wherein the surface of said display is a deformable membrane surface.

26. A method, comprising:
   receiving an input to a three-dimensional volumetric display from a pointer operated by a user relative to an input detector outside of the display, the user located at any position in proximity to the display; and
   interacting with three-dimensional content inside the display responsive to movement of the pointer by mapping the movement to the content.

* * * * *

UNITED STATES PATENT AND TRADEMARK OFFICE
CERTIFICATE OF CORRECTION

PATENT NO.         : 7,583,252 B2
APPLICATION NO.    : 10/830073
DATED              : September 1, 2009
INVENTOR(S)        : P. Kurtenbach et al.

It is certified that error appears in the above-identified patent and that said Letters Patent is hereby corrected as shown below:

Column 2, Line 44, change "system" to --system.--.

Signed and Sealed this

Twenty-ninth Day of December, 2009

David J. Kappos
*Director of the United States Patent and Trademark Office*